(12) United States Patent
Kruempelmann et al.

(10) Patent No.: US 11,853,286 B2
(45) Date of Patent: Dec. 26, 2023

(54) DYNAMIC DEPLOYMENT OF MULTIPLE DATABASE SYSTEMS WITH DATA REDUCTION

(71) Applicant: SAP SE, Walldorf (DE)

(72) Inventors: Wulf Kruempelmann, Altlussheim (DE); Susanne Schott, Walldorf (DE)

(73) Assignee: SAP SE, Walldorf (DE)

( * ) Notice: Subject to any disclaimer, the term of this patent is extended or adjusted under 35 U.S.C. 154(b) by 1 day.

(21) Appl. No.: 17/480,876

(22) Filed: Sep. 21, 2021

(65) Prior Publication Data
US 2023/0085985 A1 Mar. 23, 2023

(51) Int. Cl.
*G06F 16/30* (2019.01)
*G06F 16/23* (2019.01)
*G06F 16/2455* (2019.01)
*G06F 16/25* (2019.01)
*G06F 16/27* (2019.01)

(52) U.S. Cl.
CPC .... *G06F 16/2358* (2019.01); *G06F 16/24565* (2019.01); *G06F 16/256* (2019.01); *G06F 16/27* (2019.01)

(58) Field of Classification Search
CPC .... G06F 16/27; G06F 16/2358; G06F 16/256; G06F 16/24565
See application file for complete search history.

(56) References Cited

U.S. PATENT DOCUMENTS

| | | | |
|---|---|---|---|
| 10,417,212 B1* | 9/2019 | Hensley | G06F 16/21 |
| 2008/0263079 A1* | 10/2008 | Soneji | G06F 16/10 |
| | | | 707/999.102 |
| 2014/0172794 A1* | 6/2014 | Bartholoma | G06F 16/27 |
| | | | 707/634 |
| 2021/0089540 A1* | 3/2021 | Karl | G06F 16/24562 |
| 2021/0342364 A1* | 11/2021 | Zeier | G06F 16/27 |

\* cited by examiner

*Primary Examiner* — Khanh B Pham
(74) *Attorney, Agent, or Firm* — Mintz Levin Cohn Ferris Glovsky and Popeo, P.C.

(57) ABSTRACT

In some implementations, there is provided a method that includes detecting a first database table at a first database instance and a second database table at a second database instance, the first database table and the second database table both including a set of data, the set of data being a same data for both the first database table and the second database table; in response to the detecting, deploying the second database table, such that the second database table comprises a virtual table linked to the set of data of the first database table; and deploying a first trigger and/or a second trigger to detect whether a request is received to perform a change to the set of data at the first database table at the first database instance and/or the second database table at the second database instance. Related systems, methods, and articles of manufacture are also disclosed.

18 Claims, 7 Drawing Sheets

Detect a first database table at a first database instance and a second database table at a second database instance are the same 202

Modify deployment of the second database table to link to the first database table 204

Modify deployment of the first database table and the second database table to include a trigger to detect a change at the first database table and/or the second database table 206

Receive an indication regarding a change to a first database table T1 and/or a second database table T2 302

Lock the corresponding table being changed 304

Create a new table in the database instance 306

Copy data to the created table 308

Reconfigure or move the view from to the created table 310

Allow change to the table to proceed 312

Unlock the table 314

DYNAMIC DEPLOYMENT OF MULTIPLE DATABASE SYSTEMS WITH DATA REDUCTION

BACKGROUND

Many organizations may rely on enterprise software applications including, for example, enterprise resource planning (ERP) software, customer relationship management (CRM) software, and/or the like. These enterprise software applications may provide a variety of functionalities including, for example, invoicing, procurement, payroll, time and attendance management, recruiting and onboarding, learning and development, performance and compensation, workforce planning, and/or the like. Some enterprise software applications may be hosted by a cloud-computing platform such that the functionalities provided by the enterprise software applications may be accessed remotely by multiple end users. For example, an enterprise software application may be available as a cloud-based service including, for example, a software as a service (SaaS) and/or the like.

SUMMARY

In some embodiments, there is provided a method that includes detecting a first database table at a first database instance and a second database table at a second database instance, the first database table and the second database table both including a set of data, the set of data being a same data for both the first database table and the second database table; in response to the detecting, deploying the second database table, such that the second database table comprises a virtual table linked to the set of data of the first database table; and deploying a first trigger and/or a second trigger to detect whether a request is received to perform a change to the set of data at the first database table at the first database instance and/or the second database table at the second database instance.

In some variations, one or more of the features disclosed herein including the following features can optionally be included in any feasible combination. The same set of data is detected based on an identifier or a key associated with the set of data at the first database instance and the first database instance. The virtual table is created as a database view logic that perform a subquery to access the set of data located at the first database table at the first database instance. The first trigger comprises one or more instructions causing the first database instance to detect a change to the set of data at the first database table, and the second trigger comprises one or more instructions causing the second database instance to detect a request is received to detect a change to the set of data at the second database table. The first trigger reports the change to a deployment engine, and wherein the second trigger reports the change to the deployment engine. The method may further include receiving an indication of the change to the set of data at the first database table at the first database instance and/or the second database table at the second database instance. The method may further include in response to the change, decoupling the first database table at the first database instance and the second database table at the second database instance. The method may further include locking the first database table and the second database table. The method may further include creating a new table at the second database instance. The method may further include copying the set of data from the first database table to the new table at the second database instance. The method may further include performing the requested change. The method may further include unlocking the first database table and the second database table.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the virtualization of configuration data, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, like labels are used to refer to same or similar items in the drawings.

DETAILED DESCRIPTION

Multiple systems may be deployed to support production, test, and development, such that the deployed system including the database may be deployed as, for example, three separate instances to support production, test, and development. Likewise, multiple systems may be used across an enterprise for other reasons as well. For example, an enterprise may deploy multiple instances of a database (or portions of the database) to support different areas or clients, such as human resources, manufacturing, and the like. Some of the data in these multiple systems may be the same data. For example, configuration data (e.g., container deployment code for the cloud service, code, etc.) may be used to configure a database instance, and this configuration data may be the same across multiple database instances. Likewise, some of the system or end-user data may be the same across systems. To illustrate further, a plurality of deployed database instances may have some of the same database tables with the same data. But this data duplication may represent a waste of resources. And, in the case of an in-memory database (where memory resources are at a premium), this waste in memory should be avoided.

In some implementations, a first database table at a first database instance and a second database instance may include the same data. When this redundancy is detected, the second database table may be deployed such that it is linked to the first database table. In this way, the redundant data is not duplicated in the second database table but rather accessed from the first database table. In situations when the data at first and/or second database tables do not change, these database tables may be remain deployed in their corresponding runtime database instances in this linked configuration (where the second database table at the second database instance does not contain the redundant data but instead refers to (e.g., is linked to) the data at first database table at the first database instance. If however, there is a request to change the data at the first database table or the second database table, the second database tables may be decoupled from the first database table, such that the actual data is used at the first database table rather than rely on the link to the first database table.

Figure 1A:
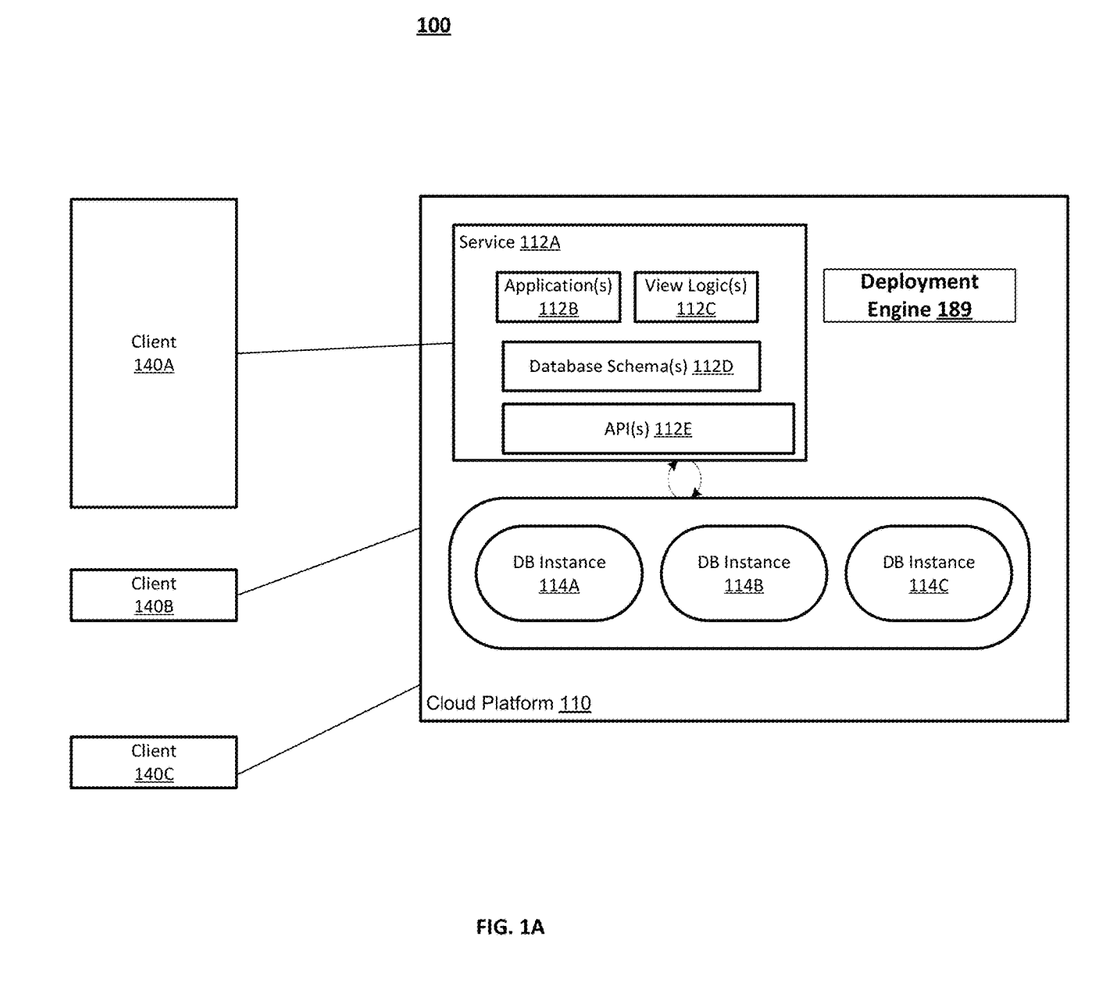
FIG. 1A depicts a system diagram illustrating a system 100 including a deployment engine, in accordance with some example embodiments.

FIG. 1A depicts a diagram illustrating an example of a system 100 consistent with some implementations of the current subject matter. Referring to FIG. 1A, the system 100 may include a cloud platform 110. The cloud platform 110 may provide resources that can be shared among a plurality of tenants. For example, the cloud platform 110 may be configured to provide a variety of services including, for example, software-as-a-service (SaaS), platform-as-a-service (PaaS), infrastructure as a service (IaaS), database as a service (DaaS), and/or the like, and these services can be accessed by one or more tenants of the cloud platform 110.

In the example of FIG. 1A, the system 100 includes a first tenant 140A (labeled client), a second tenant 140B, and a third tenant 140C, although other quantities of tenants may be implemented as well on the cloud platform 110. The clients may each comprise a user device (e.g., a computer including an application such as a browser or other type of application). And, the client may each access, via the Internet and/or other type of network or communication link(s), at least one of the services at the cloud platform. In some implementations, each of the tenants 140A-C represents a separate tenant at the cloud platform 110, such that a tenant's data is not shared with other tenants (absent permission from a tenant). Alternatively, each of the tenants 140A-C may represent a single tenant at the cloud platform 110, such that the tenants do share a portion of the tenant's data, for example.

The cloud platform 110 may include resources, such as at least one computer (e.g., a server), data storage, and a network (including network equipment) that couples the computer(s) and storage. The cloud platform may also include other resources, such as operating systems, hypervisors, and/or other resources, to virtualize physical resources (e.g., via virtual machines), provide deployment (e.g., via containers) of applications (which provide services, for example, on the cloud platform, and other resources. In the case of a "public" cloud platform, the services may be provided on-demand to a client, or tenant, via the Internet. For example, the resources at the public cloud platform may be operated and/or owned by a cloud service provider (e.g., Amazon Web Services, Azure, etc.), such that the physical resources at the cloud service provider can be shared by a plurality of tenants. Alternatively, or additionally, the cloud platform may be a "private" cloud platform, in which case the resources of the cloud platform may be hosted on an entity's own private servers (e.g., dedicated corporate servers operated and/or owned by the entity). Alternatively, or additionally, the cloud platform may be considered a "hybrid" cloud platform, which includes a combination of on-premises resources as well as resources hosted by a public or private cloud platform. For example, a hybrid cloud service may include web servers running in a public cloud while application servers and/or databases are hosted on premise (e.g., at an area controlled or operated by the entity, such as a corporate entity).

In the example of FIG. 1A, the cloud platform 110 includes a service 112A, which is provided to the client 140A. This service 112A may be deployed via a container, which provides a package or bundle of software, libraries, configuration data to enable the cloud platform to deploy during runtime the service 112A to, for example, one or more virtual machines that provide the service at the cloud platform. In the example of FIG. 1A, the service 112A is deployed during runtime, and provides at least one application such as an application 112B (which is the runtime application providing the service at 112A and served to the client 140A). To illustrate further, client 140A may access the application 112B to view data and/or query data stored in a database instance 114A, for example.

The service 112A may also provide view logic 112C. The view logic (also referred to as a view layer) links the application 112B to the data in the database instance 114A, such that a view of certain data in the database instances is generated for the application 112B. For example, the view logic may include, or access, a database schema 112D for database instance 114A in order to access at least a portion of at least one table at the database instance 114A (e.g., generate a view of a specific set of rows and/or columns of a database table or tables). In other words, the view logic 112C may include instructions (e.g., rules, definitions, code, script, and/or the like) that can define how to handle the access to the database instance and retrieve the desired data from the database instance.

The service 112A may include the database schema 112D. The database schema 112D may be a data structure that defines how data is stored in the database instance 114A. For example, the database schema may define the database objects that are stored in the database instance 114A. The view logic 112C may provide an abstraction layer between the database layer (which include the database instances 114A-C, also referred to more simply as databases) and the application layer, such as application 112B, which in this example is a multitenant application at the cloud platform 110.

The service 112A may also include an interface 112E to the database layer, such as the database instance 114A and the like. The interface 112E may be implemented as an Open Data Protocol (OData) interface (e.g., HTTP message may be used to create a query to a resource identified via a URI), although the interface 112E may be implemented with other types of protocols including those in accordance with REST (Representational state transfer). In the example of FIG. 1A, the database 114A may be accessed as a service at a cloud platform, which may be the same or different platform from cloud platform 110. In the case of REST compliant interfaces, the interface 112E may provide a uniform interface that decouples the client and server, is stateless (e.g., a request includes all information needed to process and respond to the request), cacheable at the client side or the server side, and the like.

The database instances 114A-C may each correspond to a runtime instance of a database management system (also referred to as a database). One or more of the database instances may be implemented as an in-memory database (in which most, if not all, the data, such as transactional data, is stored in main memory). In the example of FIG. 1A, the database instances are deployed as a service, such as a DaaS, at the cloud platform 110. Although the database instances are depicted at the same cloud platform 110, one or more of the database instances may be hosted on another or separate platform (e.g., on-premise) and/or another cloud platform.

Figure 1B:
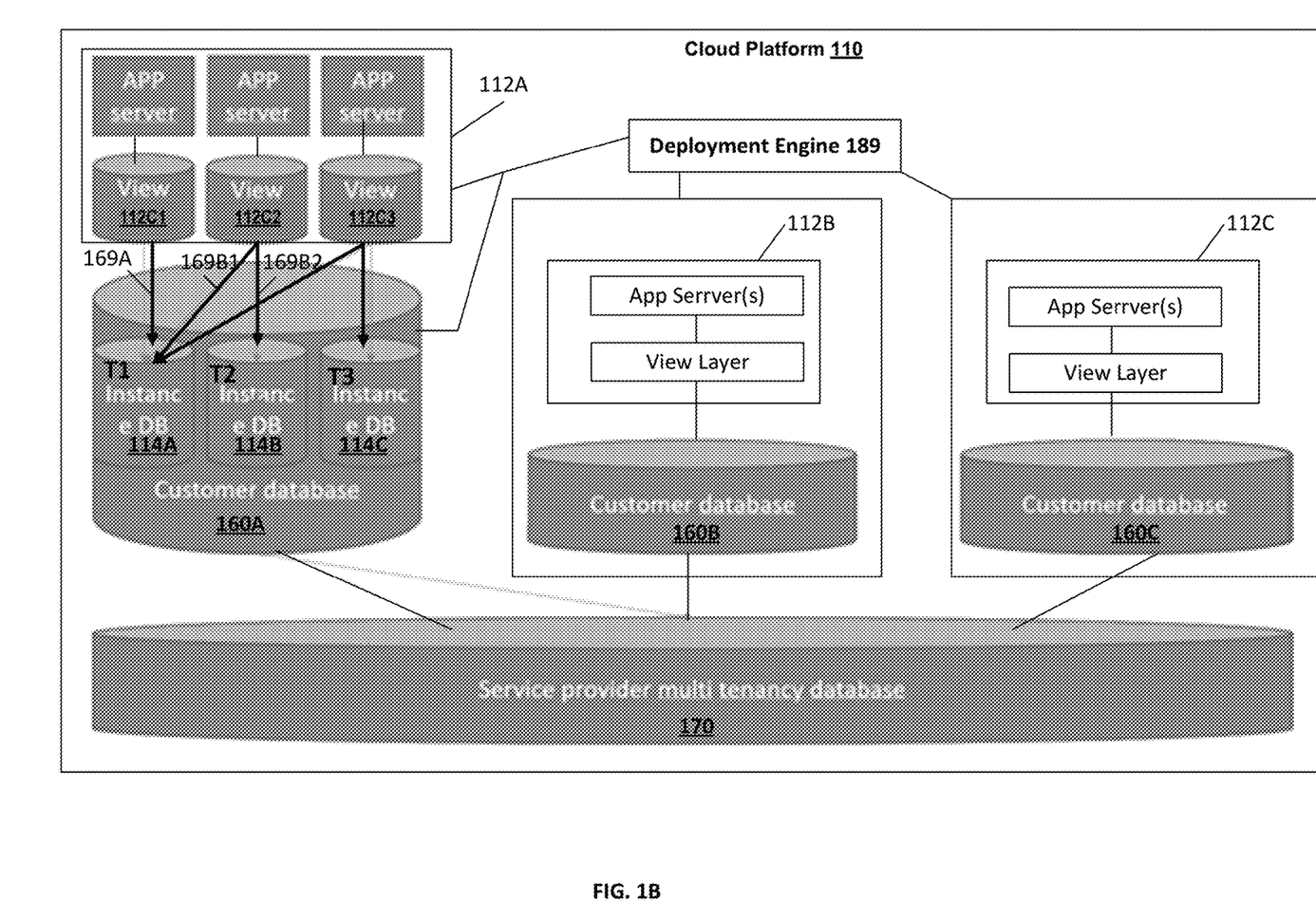
FIG. 1B depict an example of database instances, in accordance with some example embodiments.

FIG. 1B depicts a database perspective of the cloud platform 110. In particular, a first tenant, such as client 140A, may deploy a plurality of database instances 114A-C, each of which may be accessed by a corresponding service or application, such as service 112A. These multiple database instances may, as noted, share some of the same data as noted above. In the example of FIG. 1B, the database instances are from the same tenant (or enterprise) as shown by the database instances being part of the data universe of customer database 160A. For example, the enterprise (or tenant) may deploy multiple instances of the same database to support different areas of the enterprise, such as human resources, manufacturing, and the like, or may deploy multiple instances of the same database to support development, test, and production. In the example of FIG. 1B, the customer database 160B (as well as the service 112B) may correspond to another tenant, such as client 140B, and the customer database 160C (as well as the service 112C) may correspond to another tenant, such as client 140C. The service provider multitenancy database 170 may include database tables that store configuration data that is used across services and tenants to deploy the services and/or database instances at cloud platform 110.

In the example of FIG. 1B, the three databases 114A-C may include the same data (or at least include some of the same data) as shown by the first table T1 at the first database instance 114A, the second table T2 at the second database instance 114B, and the third table T3 at the third database instance 114C (in this example, the tables T1-T3 represent the same data). When the database instances include at least one table with the same data, a deployment engine 189 may detect this redundancy and may deploy the first table T1 so that table T1 contains the actual data of table T1. To reduce the data footprint in memory, the deployment engine may then deploy the second table T2 as a linked (also referred to as a virtual) table. In other words, the database instance 114B includes the second table T2 but the data contained in the table T2 is metadata, such as a link (e.g., a uniform resource identifier, a database table identifier, and/or some other identifier or address) to the actual data located at the database table T1 at database instance 114A. To illustrate further, table T1 may correspond to a master data table (which may be relatively larger than other tables and may include 1,000,000 entries for example, although other quantities are possible). This table T1 may be found in other database instances 114B and 114C, so in this example, table T1 at database instance 114A contains the actual master data, while tables T2 and T3 (at instances 114 and 114C) are virtual tables that link to (or point to) the data located at table T1 at database instance 114A. To create the virtual table T2, it may be created as a database view as follows:

CREATE VIEW<view_name table 2> AS <subquery to T1>.

In this example, the view for table 2 is created (and depicted at 112C2) and when it is called, it performs a query (or subquery) to retrieve the data stored at table T1 at database instance 114A. The virtual table T3 may be created in a similar manner to table T3.

Referring to FIG. 1B example, the view logic 112C1 is configured to access directly 169A the data at the first database table T1 at the first database instance 114A. But the second database instance's 114B view logic 112C2 is configured to access 169B1 the linked data at the first database table T1. At FIG. 1B, after the create view creates the virtual table to table T1 and thus provides a link 169B1, the link 169B2 may be deleted as the data is obtained via link 169B1.

Referring again to the example of tables T1 and T2, if the data for tables T1 and T2 does not change, the tables T1 and T2 may remain linked, such that table T1 includes the database table data while table T2 is a linked table that links to the data at table T1. However, if there is a need to change (e.g., data is added, a row is added, a column is added, data is removed, a row is removed, a column is deleted) the data at table T1 or table T2 for example, the deployment engine 189 may trigger the linked table for table T2 to be replaced with the actual data (stored at table T1) before the change is made. In other words, if the change will cause the data at tables T1 and T2 to be different, then the use of the linked table at T2 cannot be used as the data is no longer the same at both table T1 and T2.

Although some of the examples refer to a deployment engine 189, aspects of the deployment engine may be deployed in one or more of the database instances 114A-C, the service 112A, one or more of the view logic 112C1-C3, the application 112B, and/or at other components of the cloud platform 110.

Figure 2:
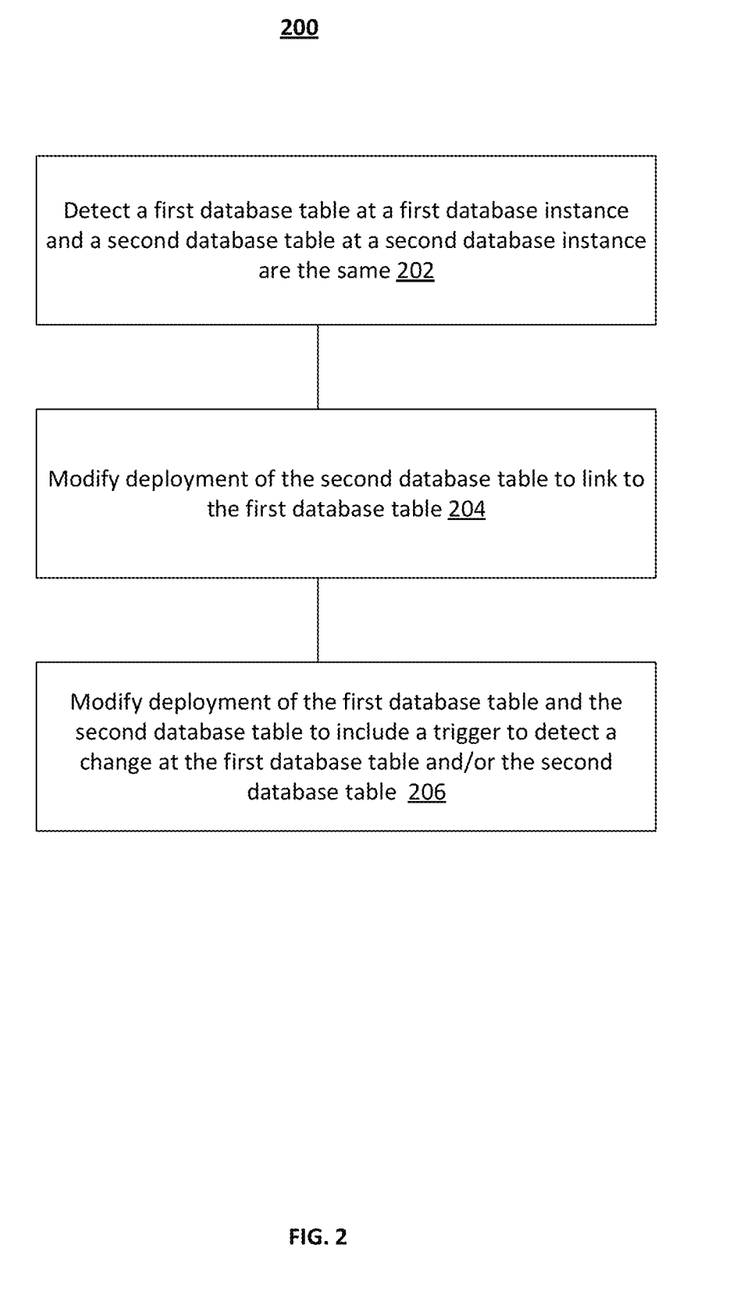
FIG. 2 depicts an example of a process for deploying database instances with data reduction, in accordance with some example embodiments.

FIG. 2 depicts an example of a process 200 for deploying databases to enable data reductions, in accordance with some example implementations. Referring also to FIG. 1B, the first tenant's 140A service at the cloud platform may be configured and deployed. For example, a container may be used at the cloud platform to orchestrate the deployment of service 112A and database instances 114A-B.

During this configuration and/or deployment phase for example, the deployment engine 189 may detect, at 202, that a first database table at a first database instance and a second database instance are the same. For example, the deployment engine may detect that the same data objects are being used at the first database table T1 at database instance 114A and second database table T2 at database instance 114B. This detection may be based on the database schema 112D information, for example. The database schema information may define for the database instances 114A-B the database objects used in the database tables at each database. For example, each database object may have a key or unique ID, so a comparison of the keys or IDs can reveal the same objects (e.g., the same key or ID would indicate the same object).

At 204, the deployment engine 189 may modify the deployment of the second database table T2, such that it is linked to the first database table T1. In other words, the second database table T2 is a virtual table that does not include the actual data but instead points to the data at the first database table. In response to the detection of 202 for example, the deployment engine may modify the deployment of the second database table T2 in the second database instance 114B, such that the second database table T2 is linked to the first database table T1 (or the data of database table T1) at the first database instance 114A. As noted, the second database table T2 does not contain the data but is linked to the actual data stored at the first database table T1. The modification may include modifying the view logic 112C2 (labeled view layer) so that a query for the data at database table T2 accesses (e.g., via 169B1) and retrieves the data from the first database table T1. For example, the create view may be used as noted above to create a virtual table. Alternatively, or additionally, the modification may include modifying the database schema information 112D so that a query for the data at database table T2 access and retrieves the data from database table T1.

At 206, the deployment engine 189 may modify the deployment of the first database table T1 and the second database table T2, such that a trigger is included in each database instance. Specifically, a first trigger may be included in the first database instance 114A for database table T1, and a second trigger may be included in the database instance 114B for database table T2. The first trigger may represent instructions to the first database instance to detect whether a request or query is received to change (e.g., insert, update, modify, delete, and/or the like) data at the first database table T1, and the second trigger may represent instructions to the second database instance to detects whether a request is received to change data at the second database table T2.

In situations when the data (which is at database tables T1 and T2) does not change, the database tables T1 and T2 may be deployed in runtime database instances 114A-B, such that the database table T2 does not include actual data but instead refers to (e.g., is linked to or is created as a virtual table) the data at the database table T1—saving thus the in-memory resources at the database(s).

Figure 3:
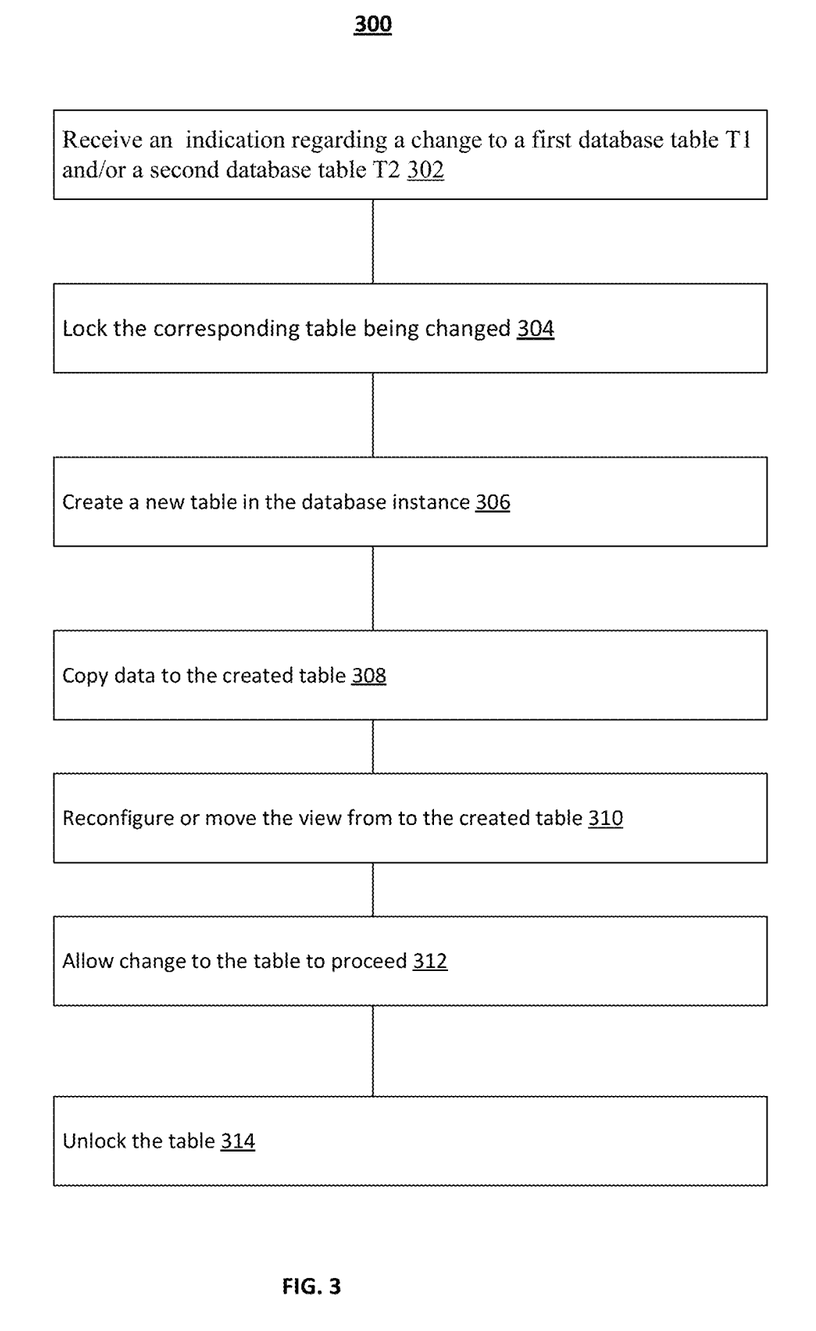
FIG. 3 depicts another example of a process for deploying database instances with data reduction, in accordance with some example embodiments.

FIG. 3 depicts an example of a process 300 for decoupling linked database tables, in accordance with some example implementations. If there is a change requested for the data at the database table T1 or database table T2 for example, the database tables T1 and T2 may be decoupled, such that the second database table T2 may be reconfigured to include the actual data rather than rely on the link to the first database table T1.

At 302, an indication may be received regarding a requested change to database table T1 or database table T2. If a request or a query is received (e.g., from the client 140A, service 112A, application 112D, and/or the like) to make a change to the second database table T2 at the second database instance 114B, a trigger (e.g., the second trigger) at the second database instance may provide an indication to the deployment engine 189 of the requested change to the second database table T2. Alternatively, of additionally, a request or query may be received to make a change to the first database table T1, in which case the first trigger at the first database instance may provide an indication to the deployment engine 189 of the requested change to database table T1.

As noted one or more aspects of the deployment engine 189 may be deployed in one or more of the database instances 114A-C, the service 112A, one or more of the view logic 112C1-C3, the application 112B, and/or at other components of the cloud platform 110.

At 304, the corresponding table(s) being changed may be locked. If for example, the client 140A proposes deleting a column of the second database table T2 (where that same change is not being done to first database table T1, for example), the deployment engine 189 may send a message to the second database instance 114B to lock the second database table T2 and send a message to the database instance 114A to lock table T1.

Figure 4:
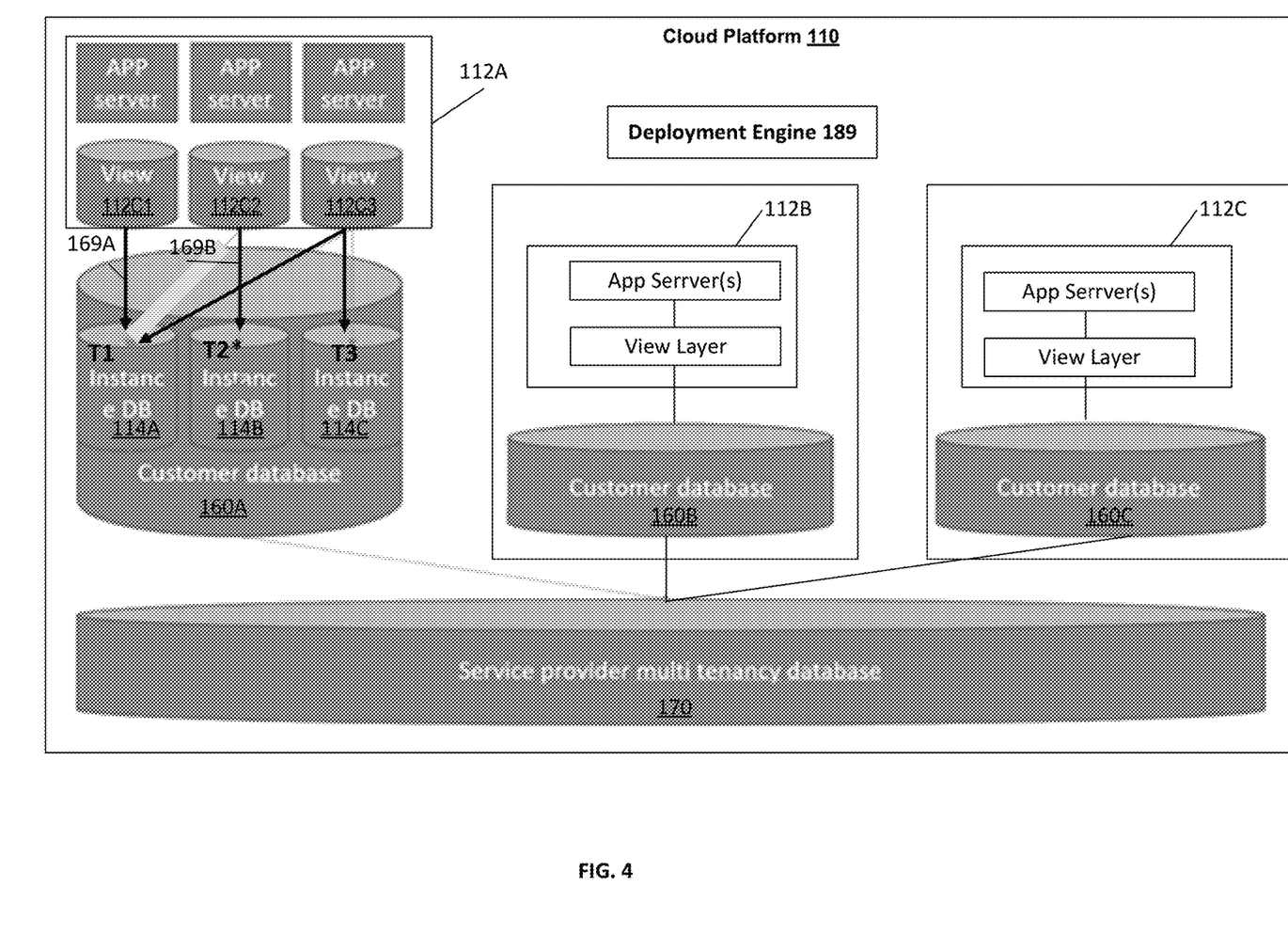
FIG. 4 depicts another example of database instances, in accordance with some example embodiments.

At 306-308, the deployment engine 189 may then instruct the second database instance 114B to create a new table T2*and to then copy the data contents of the first database table T1 to the newly created table T2*as shown at FIG. 4. For example, rather than use a virtual table at T2 (e.g., via a create view), the second database instance 114B creates an actual table (e.g., using a CREATE table) to hold the data located at table T1. After the table T2 is created, the data from table T1 is copied (or moved) to table T2. FIG. 4 depicts database table T2*at the database instance 114B with the view logic 112C2 now accessing 169B directly from table T2*, rather than accessing via a virtual table 169B1 the data from table T1 as shown an FIG. 1B.

At 310, the second database instance's view logic 112C2 (which had been accessing via 169B1 the data at the first database table T1) may then be reconfigured to now view via 169B (as shown at FIG. 4) the data now copied into the newly created database table T2*as shown at FIG. 4. In some implementations, the reconfiguration may be in the form of moving the view logic (e.g., the view logic) to the second database table T2*. As noted, the view logic 112C2 may be modified from a virtual table (which accesses the table T1 data via 169B1) to an actual table query access via 169B of the actual data at database instance 114B.

At 312, the requested change to the second database table (which is now labeled as table T2*at FIG. 4) is allowed to proceed. As such, once the new table is created T2*at the second database instance 114B and the data is copied over from linked table T1, the second database instance is allowed to perform the requested change to the database table T2*at the second database instance 114B.

At 314, the database table may be unlocked. Referring to the previous example, the database table T2*is unlocked after the change operation.

In some implementations, a table may be split into one or more name range-based tables. One table is split in two or more tables (which have the same structure), but some name ranges divide the content. These tables might be joined into a union view into the view layer. The different customer (or tenant) systems might add only data to one name range, which means, that only this partial used table must be copied, but not all name range tables. For example, if some data is delivered with a tenant system (e.g., region codes or postal codes), the tenant/customer may extend (or modify) these data. When this is the case, the delivered data may start with for example a range of letters A-Y, but the customer data may start with Z. View logic may be used such that a select with a starting letter of A-Y goes to table T1 (as this is global or common for all customer/tenant systems), but data, starting with Z are read instead from T2. The data from tables T1 and T2 may later be joined with a union.

To illustrate with another example, a first tenant may deploy at the cloud platform a first system including database instance 114A. This first system may correspond to a development system used for system development. As noted, the first system may include a view layer (e.g., view logic 112C1) to decouple the database layer (e.g., database 114A) from the application server. In this example, the database tables of the first database table may be deployed, such that the data for those tables corresponds to actual (or real) database tables including actual (or real) data. For example, these tables may be persisted in an instance of database 114A (although one or more of the database tables may be persisted in the service provider multi tenancy database 170 as well). In this example, the first tenant may create configuration data for the processes of the service 112A and/or other types of data, which may include master data used for testing. At this stage, the first tenant may deploy at the cloud platform a second system including database instance 114B to support testing. In this example, the view layer (e.g., view logic 112C2) for the second system is created such that one or more (if not all) the views point to the database tables of the first database instance 114A. And, the triggers may be installed at each of the tables to detect requests or queries for changes (e.g., insert, update, and delete) to the database table data. In some implementation, only a single trigger might be deployed. For example, if data changes to table T1 will always be used at table T2, then a trigger at table T1 is not needed to trigger process 300 for decoupling. However, if changes to table T2 are not used at table T1, then a trigger at table T2 is needed to trigger process 300 for decoupling. In some implementations, triggers are deployed at both tables to detect a change and decouple. If there is a change detected by at least one trigger, the process 300 may be used to decouple the two systems.

Figure 5:
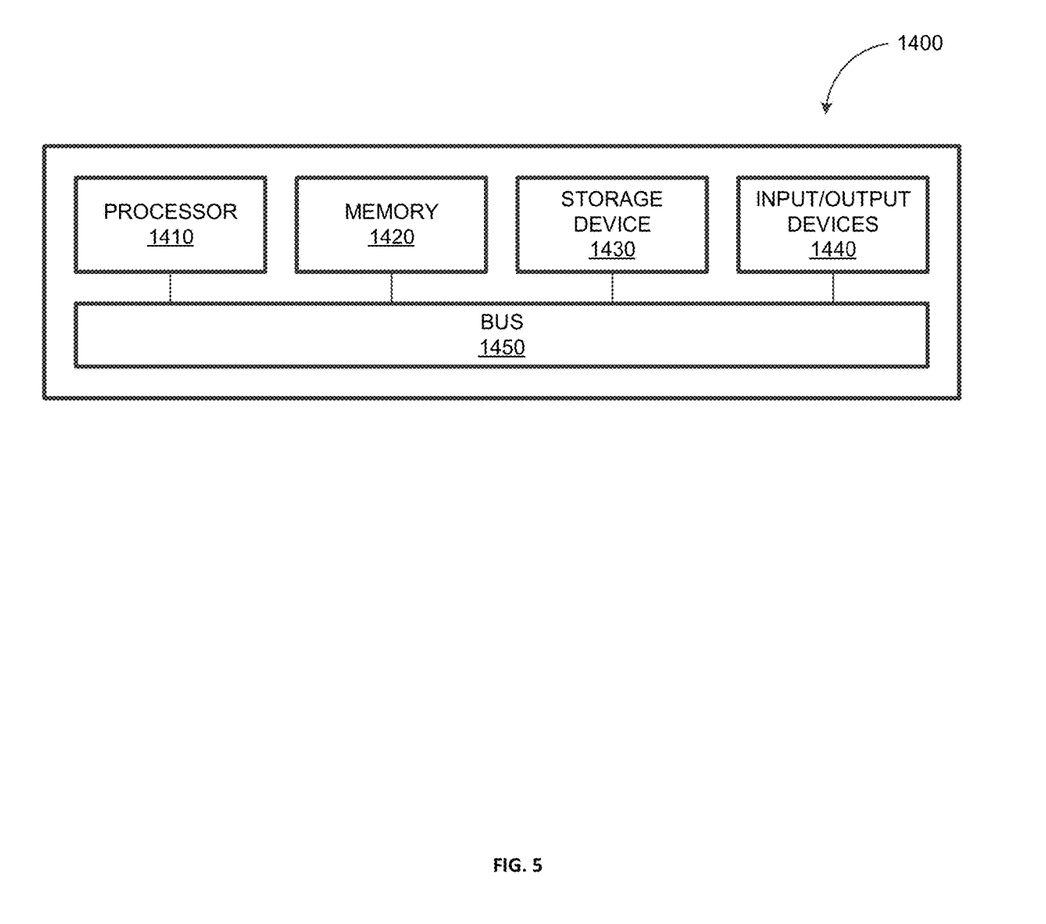
FIG. 5 depicts a block diagram illustrating a computing system, in accordance with some example embodiments.

FIG. 5 depicts a block diagram illustrating a computing system 4100 consistent with implementations of the current subject matter. The computing system 1400 can be used to implement the clients 140A-C, at least a portion of the cloud platform, and/or any components depicted at FIGS. 1A-C. As shown in FIG. 5, the computing system 1400 can include a processor 1410, a memory 1420, a storage device 1430, and input/output devices 1440. The processor 1410, the memory 1420, the storage device 1430, and the input/output devices 1440 can be interconnected via a system bus 1450. The processor 1410 is capable of processing instructions for execution within the computing system 1400. Such executed instructions can implement one or more components of, for example, the activation engine 199. In some implementations of the current subject matter, the processor 1410 can be a single-threaded processor. Alternately, the processor 1410 can be a multi-threaded processor. Alternately, or additionally, the processor 1410 can be a multi-processor core. The processor 1410 is capable of processing instructions stored in the memory 1420 and/or on the storage device 1430 to display graphical information for a user interface provided via the input/output device 1440. The memory 1420 is a computer readable medium such as volatile or non-volatile that stores information within the computing system 1400. The memory 1420 can store data structures representing configuration object databases, for example. The storage device 430 is capable of providing persistent storage for the computing system 400. The storage device 1430 can be a solid-state device, a floppy disk device, a hard disk device, an optical disk device, a tape device, and/or any other suitable persistent storage means. The input/output device 1440 provides input/output operations for the computing system 1400. In some implementations of the current subject matter, the input/output device 440 includes a keyboard and/or pointing device. In various implementations, the input/output device 1440 includes a display unit for displaying graphical user interfaces. According to some implementations of the current subject matter, the input/output device 1440 can provide input/output operations for a network device. For example, the input/output device 1440 can include Ethernet ports or other networking ports to communicate with one or more wired and/or wireless networks (e.g., a local area network (LAN), a wide area network (WAN), the Internet).

Figure 6:
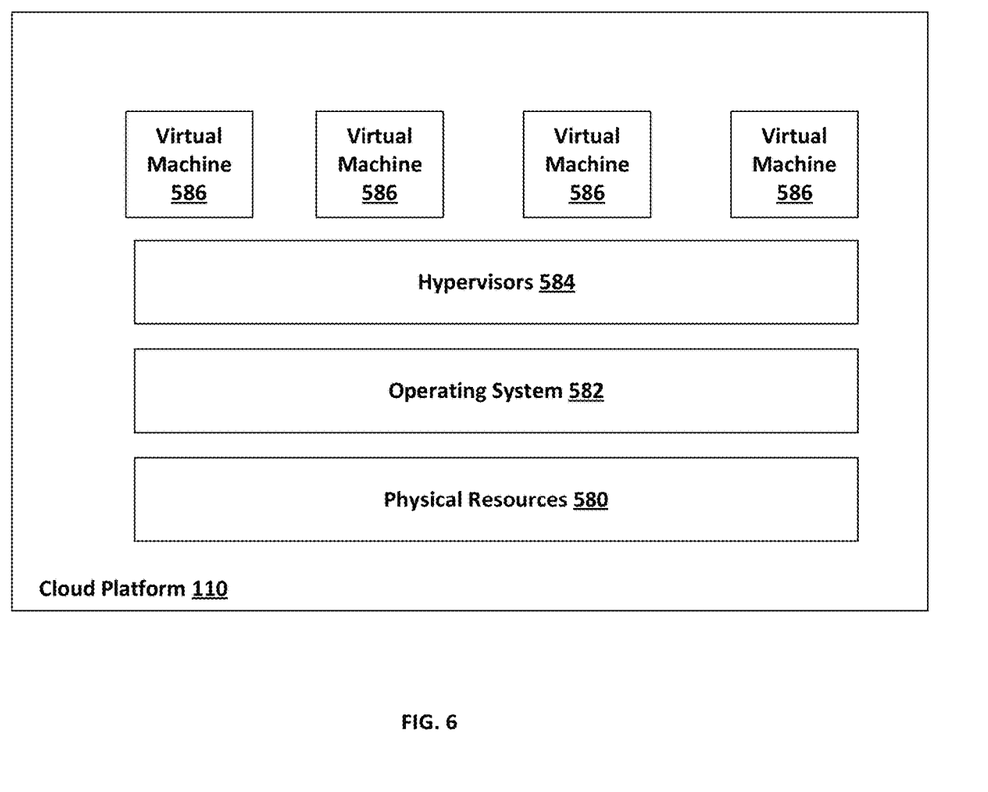
FIG. 6 depicts an example implementation of the cloud platform, which provided the cloud services.

FIG. 6 depicts an example implementation of the cloud platform 110, which provided the cloud services. The cloud platform 110 may include physical resources 680, such as at least one hardware servers, at least one storage, at least one memory, at least one network interface, and the like. The cloud server may also include infrastructure, as noted above, which may include at least one operating systems 682 for the physical resources and at least one hypervisor 684 (which may create and run at least one virtual machine 686). For example, each multitenant application may be run on a corresponding virtual machine.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: detecting a first database table at a first database instance and a second database table at a second database instance, the first database table and the second database table both including a set of data, the set of data being a same data for both the first database table and the second database table; in response to the detecting, deploying the second database table, such that the second database table comprises a virtual table linked to the set of data of the first database table; and deploying a first trigger and/or a second trigger to detect whether a request is received to perform a change to the set of data at the first database table at the first database instance and/or the second database table at the second database instance.

Example 2: The system of example 1, wherein the same set of data is detected based on an identifier or a key associated with the set of data at the first database instance and the first database instance.

Example 3: The system of any one of examples 1-2, wherein the virtual table is created as a database view logic that perform a subquery to access the set of data located at the first database table at the first database instance.

Example 4: The system of any one of examples 1-3, wherein the first trigger comprises one or more instructions causing the first database instance to detect a change to the set of data at the first database table, and the second trigger comprises one or more instructions causing the second database instance to detect a request is received to detect a change to the set of data at the second database table.

Example 5: The system of any one of examples 1-4, wherein the first trigger reports the change to a deployment engine, and wherein the second trigger reports the change to the deployment engine.

Example 6: The system of any one of examples 1-5 further comprising: receiving an indication of the change to the set of data at the first database table at the first database instance and/or the second database table at the second database instance.

Example 7: The system of any one of examples 1-6, further comprising: in response to the change, decoupling the first database table at the first database instance and the second database table at the second database instance.

Example 8: The system of any one of examples 1-7, wherein the decoupling comprises: locking the first database table and the second database table.

Example 9: The system of any one of examples 1-8 further comprising: creating a new table at the second database instance.

Example 10: The system of any one of examples 1-9 further comprising: copying the set of data from the first database table to the new table at the second database instance.

Example 11: The system of any one of examples 1-10 further comprising: performing the requested change.

Example 12: The system of any one of examples 1-11 further comprising: unlocking the first database table and the second database table.

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one data processor; and
   at least one memory storing instructions, which when executed by the at least one data processor, result in operations comprising:
   detecting, by a deployment engine of a multitenant cloud platform, a first database table at a first database instance and a second database table at a second database instance, the first database table and the second database table both including a set of data, the set of data being a same data for both the first database table and the second database table;
   in response to the detecting, deploying, by the deployment engine of the multitenant cloud platform, the first database table and the second database table, such that the first database table is deployed with the set of data being the same data for the first database table and the second database table, and the deployed second database table comprises a virtual table linked to the set of data of the first database table, wherein the virtual table is created as a database view logic at a service interfacing the first database table and the second database table, wherein the database view logic at the service is configured to respond to a query towards the second database table by performing a subquery towards the first database table in order to access the set of data located at the first database table at the first database instance; and deploying, by the deployment engine of the multitenant cloud platform, a first trigger to the first database instance and/or a second trigger to the second database instance to detect whether a request is received to perform a change to the set of data at the first database table at the first database instance and/or the second database table at the second database instance.

2. The system of claim 1, wherein the same set of data is detected based on an identifier or a key associated with the set of data at the first database instance and the second database instance, and wherein the service includes a second database view logic configured to respond to a query towards the first database table by directly accessing the first database table at the first database instance.

3. The system of claim 1, wherein the first trigger comprises one or more instructions causing the first database instance to detect a change to the set of data at the first database table, and the second trigger comprises one or more instructions causing the second database instance to detect a request is received to detect a change to the set of data at the second database table.

4. The system of claim 3, wherein the first trigger reports the change to a deployment engine, and wherein the second trigger reports the change to the deployment engine.

5. The system of claim 1 further comprising:
receiving an indication of the change to the set of data at the first database table at the first database instance and/or the second database table at the second database instance.

6. The system of claim 5 further comprising:
in response to the change, decoupling the first database table at the first database instance and the second database table at the second database instance.

7. The system of claim 6, wherein the decoupling comprises:
locking the first database table and the second database table.

8. The system of claim 7 further comprising:
creating a new table at the second database instance.

9. The system of claim 8 further comprising:
copying the set of data from the first database table to the new table at the second database instance.

10. The system of claim 9 further comprising:
performing the requested change.

11. The system of claim 10 further comprising:
unlocking the first database table and the second database table.

12. A method comprising:
detecting, by a deployment engine of a multitenant cloud platform, a first database table at a first database instance and a second database table at a second database instance, the first database table and the second database table both including a set of data, the set of data being a same data for both the first database table and the second database table;
in response to the detecting, deploying, by the deployment engine of the multitenant cloud platform, the first database table and the second database table, such that the first database table is deployed with the set of data being the same data for the first database table and the second database table, and the deployed second database table comprises a virtual table linked to the set of data of the first database table, wherein the virtual table is created as a database view logic at a service interfacing the first database table and the second database table, wherein the database view logic at the service is configured to respond to a query towards the second database table by performing a subquery towards the first database table in order to access the set of data located at the first database table at the first database instance; and deploying, by the deployment engine of the multitenant cloud platform, a first trigger to the first database instance and/or a second trigger to the second database instance to detect whether a request is received to perform a change to the set of data at the first database table at the first database instance and/or the second database table at the second database instance.

13. The method of claim 12, wherein the same set of data is detected based on an identifier or a key associated with the set of data at the first database instance and the second database instance, and wherein the service includes a second database view logic configured to respond to a query towards the first database table by directly accessing the first database table at the first database instance.

14. The method of claim 12, wherein the first trigger comprises one or more instructions causing the first database instance to detect a change to the set of data at the first database table, and the second trigger comprises one or more instructions causing the second database instance to detect a request is received to detect a change to the set of data at the second database table.

15. The method of claim 14, wherein the first trigger reports the change to a deployment engine, and wherein the second trigger reports the change to the deployment engine.

16. The method of claim 12, further comprising:
receiving an indication of the change to the set of data at the first database table at the first database instance and/or the second database table at the second database instance.

17. The method of claim 16, further comprising:
in response to the change, decoupling the first database table at the first database instance and the second database table at the second database instance;
locking the first database table and the second database table;
creating a new table at the second database instance;
copying the set of data from the first database table to the new table at the second database instance;
performing the requested change; and
unlocking the first database table and the second database table.

18. A non-transitory computer-readable medium including instructions, which when executed by at least one data processor, result in operations comprising:
detecting, by a deployment engine of a multitenant cloud platform, a first database table at a first database instance and a second database table at a second database instance, the first database table and the second database table both including a set of data, the set of data being a same data for both the first database table and the second database table;
in response to the detecting, deploying, by the deployment engine of the multitenant cloud platform, the first database table and the second database table, such that the first database table is deployed with the set of data being the same data for the first database table and the second database table, and the deployed second database table comprises a virtual table linked to the set of data of the first database table, wherein the virtual table is created as a database view logic at a service interfacing the first database table and the second database table, wherein the database view logic at the service is configured to respond to a query towards the second database table by performing a subquery towards the first database table in order to access the set of data located at the first database table at the first database instance; and deploying, by the deployment engine of the multitenant cloud platform, a first trigger to the first database instance and/or a second trigger to the second database instance to detect whether a request is received to perform a change to the set of data at the first database table at the first database instance and/or the second database table at the second database instance.

* * * * *